US012215830B2

(12) United States Patent
Lechthaler

(10) Patent No.: US 12,215,830 B2
(45) Date of Patent: Feb. 4, 2025

(54) FILLING STATION FOR PRESSURIZED FLUIDS

(71) Applicant: Wolftank Hydrogen GmbH, Bozen (IT)

(72) Inventor: Markus Lechthaler, Bozen (IT)

(73) Assignee: Wolftank Hydrogen GmbH, Bozen (IT)

( * ) Notice: Subject to any disclaimer, the term of this patent is extended or adjusted under 35 U.S.C. 154(b) by 231 days.

(21) Appl. No.: 18/068,841

(22) Filed: Dec. 20, 2022

(65) Prior Publication Data

US 2023/0194051 A1 Jun. 22, 2023

(30) Foreign Application Priority Data

Dec. 22, 2021 (AT) .............................. A 51040/2021

(51) Int. Cl.
*F17C 5/06* (2006.01)
*F17C 5/00* (2006.01)

(52) U.S. Cl.
CPC ................ *F17C 5/06* (2013.01); *F17C 5/007* (2013.01); *F17C 2221/012* (2013.01); *F17C 2221/033* (2013.01); *F17C 2227/0135* (2013.01); *F17C 2227/043* (2013.01); *F17C 2265/065* (2013.01)

(58) Field of Classification Search
CPC ...... F17C 5/06; F17C 5/007; F17C 2221/012; F17C 2221/033; F17C 2227/0135; F17C 2227/043; F17C 2265/065
See application file for complete search history.

(56) References Cited

U.S. PATENT DOCUMENTS

2013/0248000 A1 9/2013 Killeen et al.
2018/0080608 A1 3/2018 Reddi et al.
2022/0136655 A1* 5/2022 Pollica .................... B67D 7/80
2024/0183496 A1* 6/2024 Oshima ................ F17C 13/025

FOREIGN PATENT DOCUMENTS

CA 3101777 A1 7/2021
WO 2021/083471 A1 5/2021

OTHER PUBLICATIONS

Office Action received for Austrian Patent Application No. A 51040/2021, mailed on Jul. 18, 2022, 5 pages (2 pages of English Translation and 3 pages of Official Copy).

* cited by examiner

*Primary Examiner* — P. Macade Nichols
(74) *Attorney, Agent, or Firm* — Weaver IP L.L.C.

(57) ABSTRACT

A filling station for pressurized fluids has a storage container and a dispenser supplied thereby, comprising a high-pressure path and a low-pressure path. The storage container is partitioned into separate sections, which are each connected to the input of a high-pressure pump via a first switching valve and to the output of said high-pressure pump via a second switching valve. The first or second switching valves are connected on their pump sides to the low-pressure path of the dispenser via a third switching valve. The output of the high-pressure pump supplies a high-pressure reservoir via a fourth switching valve, which high-pressure reservoir is connected to the high-pressure path of the dispenser via a fifth switching valve.

11 Claims, 1 Drawing Sheet

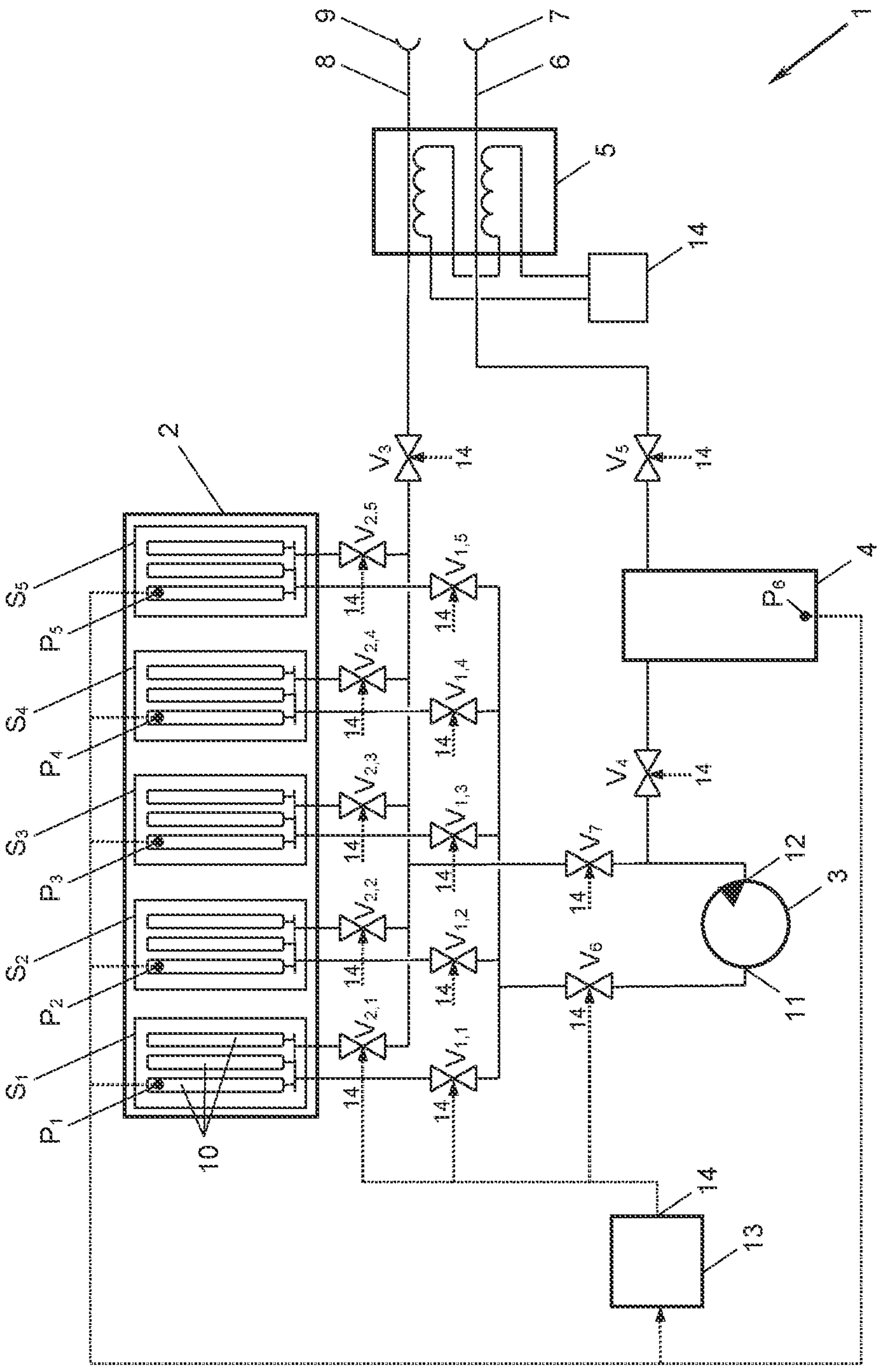
1
2
3
4
5
6
7
8
9
10
11
12
13
14
$S_1$
$S_2$
$S_3$
$S_4$
$S_5$
$P_1$
$P_2$
$P_3$
$P_4$
$P_5$
$P_6$
$V_{1,1}$
$V_{1,2}$
$V_{1,3}$
$V_{1,4}$
$V_{1,5}$
$V_{2,1}$
$V_{2,2}$
$V_{2,3}$
$V_{2,4}$
$V_{2,5}$
$V_3$
$V_4$
$V_5$
$V_6$
$V_7$

FILLING STATION FOR PRESSURIZED FLUIDS

CROSS-REFERENCE TO RELATED APPLICATIONS

This application claims priority to the Austrian Patent Application No. A 51040/2021 filed Dec. 22, 2021, the entirety of which is incorporated herein by reference.

TECHNICAL FIELD

The present disclosed subject matter relates to a filling station for pressurized fluids, e.g., hydrogen or natural gas, comprising a storage container for the pressurized fluid and a dispenser supplied thereby.

BACKGROUND

Filling stations of this type have to meet different requirements during operation.

For instance, filling vehicles as quickly as possible requires the highest possible pressure level of the pressurized fluid during dispensing, for example over 275 bar for filling trucks or buses, or over 700 bar for filling passenger cars. To do this, high-volume storage containers are currently required on site for the pressurized fluid, which in particular makes it difficult to retrofit existing mineral oil filling stations for hydrogen or natural gas. The high-volume storage containers need to be regularly refilled from tankers, which is not only time-consuming, but can also result in interruptions to operation if the pressure level in the storage container is no longer sufficient for rapid refueling processes.

BRIEF SUMMARY

The aim of the disclosed subject matter is to overcome the drawbacks of said art and to provide an improved filling station for pressurized fluids which provides a pressure level that is sufficient for rapidly refueling different types of vehicle with as few interruptions as possible.

This aim is achieved, according to the disclosed subject matter, by a filling station for pressurized fluids comprising a storage container for the pressurized fluid and a dispenser supplied by the storage container,

- wherein the dispenser has a high-pressure path and a low-pressure path for dispensing the pressurized fluid,
- wherein the storage container is partitioned into separate sections, which are each connected to the input of a high-pressure pump via a first switching valve and to the output of said high-pressure pump via a second switching valve,
- wherein the first or second switching valves, on their pump sides, are connected to the low-pressure path of the dispenser via a third switching valve, and
- wherein the output of the high-pressure pump supplies a high-pressure reservoir via a fourth switching valve, the high-pressure reservoir being connected to the high-pressure path of the dispenser via a fifth switching valve.

The filling station according to the disclosed subject matter provides two different pressure levels at the dispenser, specifically, a low-pressure path for refueling trucks and buses and a high-pressure path for refueling passenger cars, wherein a separate high-pressure reservoir is only provided for the high-pressure path. The low-pressure path is supplied directly from the storage container, which, for this purpose, is partitioned into individual pressure sections which can provide a higher pressure level for refueling than a non-partitioned storage container by transferring the fluid from one section into the other section from the section currently being used.

In an optional embodiment, for this purpose, all the switching valves can be controlled by a controller, which is connected to pressure sensors of the sections and of the high-pressure reservoir and is configured, when pressurized fluid is dispensed via the low-pressure path, to connect the sections to the low-pressure path individually in succession via the respective second switching valve and the third switching valve, and, when pressurized fluid is dispensed via the high-pressure path, to connect the high-pressure reservoir to the high-pressure path via the fifth switching valve.

In this case, it may be advantageous for the controller to be configured to perform a switch to the next section in said succession when the pressure in the section currently being used for dispensing drops below a predetermined first threshold value.

Optionally, the controller is configured to transfer pressurized fluid from at least one section, the pressure of which is below the first threshold value, via the respective first switching valve, the high-pressure pump, and the respective second switching valve into the section used or intended for the dispensing.

According to another optional feature, the controller is configured to refill the high-pressure reservoir from at least one of the sections via the respective first switching valve, the high-pressure pump, and the fourth switching valve when the pressure in the high-pressure reservoir drops below a predetermined second threshold value.

The filling station according to the disclosed subject matter makes it possible to dispense pressurized fluid at two different pressure levels as desired, while requiring the lowest possible amount of space for just one high-pressure reservoir for the higher pressure level. The storage container used for the lower pressure level can thus, e.g., be in the form of a transportable container. This means that it is not necessary to fill the storage containers with regular tanker deliveries. The storage container itself can, in the form of an interchangeable container, be replaced with a full, “fresh” container in a simple manner. This also makes it easier to retrofit existing mineral oil filling stations for pressurized fluid operation, since they do not need their own high-volume storage containers to be installed on site which are sufficient for each delivery of a new container containing a fresh supply.

If the storage container is in the form of a transportable container, the first and second switching valves and an or said controller can optionally be integrated in the container in order to make it easier to install the filling station on site or retrofit existing mineral oil filling stations.

It may be advantageous for each section to consist of a group of pressure cylinders connected in parallel. The storage container can thus be composed of a plurality of conventional, standardized pressurized gas cylinders, which are each interconnected in groups to form the sections. If the storage container is in the form of a transportable container, refilling the filling station thus consists in replacing pressurized gas cylinders container by container.

In another optional embodiment of the disclosed subject matter, all the first switching valves are connected to the input of the high-pressure pump, with a shared sixth switching valve being interposed. This serves to protect the high-pressure pump if the low-pressure path is fed via the first switching valves. Alternatively or additionally, all the second switching valves can be connected to the output of the high-pressure pump, with a seventh switching valve being interposed. This is useful for protecting the high-pressure pump if the low-pressure path is fed via the second switching valves.

In any embodiment, it may be advantageous for the dispenser to have a cooler both for the high-pressure path and the low-pressure path. As a result, the refueling can take place at that low temperature, e.g., −40° C., that is required for the respective pressure level.

BRIEF DESCRIPTION OF THE DRAWINGS/FIGURES

The disclosed subject matter will be explained in greater detail in the following with reference to an exemplary embodiment shown in the accompanying drawings, in which the single FIGURE, FIG. 1, shows a block diagram of a filling station according to the disclosed subject matter.

DETAILED DESCRIPTION

FIG. 1 shows a filling station 1 for pressurized fluids such as hydrogen, liquefied natural gas (LNG), or the like. The main components of the filling station 1 are a storage container 2 for the pressurized fluid and a dispenser 5 supplied by the storage container 2 directly on one hand and via a high-pressure pump (compressor) 3 and a high-pressure reservoir 4 on the other hand.

The dispenser 5 has a high-pressure path 6 comprising a dispenser connection 7 for pressurized fluid under high pressure, e.g., for refueling passenger cars, and a low-pressure path 8 comprising a dispenser connection 9 for pressurized fluid under low pressure, e.g., for refueling trucks and buses.

In this case, the terms "high pressure" and "low pressure" should be understood to be relative to one another, in the sense that the pressure level in the high-pressure path 6 when refueling a vehicle connected to the dispenser connection 7 is higher than the pressure level in the low-pressure path 8 when refueling a vehicle connected to the dispenser connection 9. For example, the pressure in the tank of a passenger car can be up to 700 bar (and accordingly less when the tank is half full or empty), and for refueling a passenger car that is full or almost full, an accordingly higher pressure is required in the high-pressure path 6 in order for pressurized fluid to be able to flow into the vehicle tank, for example a pressure in the high-pressure path 6 that is at least 100 bar higher. For example, the pressure level in the high-pressure path 6 may be in the range of 600 to 1000 bar, optionally in the range of 700 to 900 bar, e.g., approximately 900 bar.

For refueling passengers and buses, a lower pressure level is generally sufficient, since the pressure in a completely full or almost full truck or bus tank is in the range of approximately 350 bar. The pressure level in the low-pressure path 8 may be in the range of 250 to 525 bar, optionally in the range of 275 to 500 bar, e.g., approximately 500 bar.

The storage container 2 is divided into a plurality of separate (in this case, five) sections $S_1$, $S_2$, . . . , generally $S_i$. In a practical embodiment, each section $S_i$ is formed by a group of pressure cylinders ("gas cylinders") interconnected in parallel.

The entire storage container 2 can be constructed to be stationary or transportable, for example in the form of a standardized container, e.g., a 30-foot container, in which the pressure cylinders 10 are arranged, so as to be interconnected in groups to form the sections $S_i$. A containerized storage container 2 of this kind can, for example, be set down by a semitrailer truck directly at the site of the filling station 1 and, after being emptied, can be replaced with a storage container 2 freshly filled with pressurized fluid.

Each section $S_i$ of the storage container 2 is connected to the input 11 of a high-pressure pump 3 via a first switching valve $V_{1,i}$ and to the output 12 of the high-pressure pump 3 via a second switching valve $V_{2,i}$. In the present example comprising five sections $S_1$-$S_5$, there is thus a set $V_{1,1}$-$V_{1,5}$ of first switching valves $V_{1,i}$ and a set $V_{2,1}$-$V_{2,5}$ of second switching valves $V_{2,i}$.

The second switching valves $V_{2,i}$ are connected to the low-pressure path 8 of the dispenser 5 via a third switching valve $V_3$ on their pump sides, i.e. on their sides facing away from the storage container 2 and facing the high-pressure pump 3. Alternatively (not shown), the first switching valves $V_{1,i}$ could instead be connected to the low-pressure path 5 via a third switching valve $V_3$ on their pump sides.

The high-pressure path 6 is fed via the high-pressure pump 3 and the high-pressure reservoir 4, and specifically by the output 12 of the high-pressure pump 3 supplying the high-pressure reservoir 4 via a fourth switching valve $V_4$, and this reservoir is connected to the high-pressure path 6 of the dispenser 5 via a fifth switching valve $V_5$.

Optionally, all the first switching valves $V_{1,i}$ can be connected to the input 11 of the high-pressure pump 3, with a sixth switching valve $V_6$ being interposed. Also optionally, all the second switching valves $V_{2,i}$ can be connected to the output 12 of the high-pressure pump 3, with a seventh switching valve $V_7$ being interposed.

All the switching valves $V_{1,i}$, $V_{2,i}$, $V_3$, $V_4$, $V_5$, $V_6$ and $V_7$ are controlled by a central controller 13, wherein the control paths 14 of the controller 13 to the individual switching valves are only shown in sections for the sake of clarity of the FIGURE.

If the storage container 2 is in the form of a transportable container, the switching valves $V_{1,i}$, $V_{2,i}$, optionally also the switching valves $V_3$, $V_4$, $V_6$ and $V_7$ and the controller 13, can optionally be installed in the container in order to make it easier to install the filling station 1 on site. The containerized storage container 2 equipped with these built-in components then only needs to be positioned on site and connected to the high-pressure pump 3 comprising the high-pressure reservoir 4 and the switching valve $V_5$ and to the dispenser 5.

The controller 13 receives measured pressure values from pressure sensors $P_1$, $P_2$, . . . , generally $P_i$, which are each assigned to one of the sections $S_1$, $S_2$, . . . , $S_i$ and to the high-pressure reservoir 4 and measure the internal pressure thereof. Further pressure sensors (not shown) can measure the pressure level in the high-pressure path 6, in the low-pressure path 8, at the inputs and outputs 11, 12 of the high-pressure pump 3, and/or at all the further pressurized fluid lines of the filling station 1.

The controller 13 is configured such that it controls the switching valves $V_{1,i}$, $V_{2,i}$, $V_3$, $V_4$, $V_5$ and (if present) $V_6$, $V_7$ on the basis of the measured pressure values from the pressure sensors $P_i$ such that, when the sections $S_i$ are used successively and alternately, a sufficient pressure level is maintained in the low-pressure path 8 and, using the high-pressure reservoir 4, in the high-pressure path 6 for as long as possible, wherein the high-pressure pump 3 is used for both paths as follows.

When pressurized fluid is dispensed via the low-pressure path 8, the controller 13 connects the sections $S_i$ to the low-pressure path 8 individually and in succession, i.e. one after the other, via the respective second switching valve $V_{2,i}$ (or, alternatively, the respective first switching valve $V_{1,i}$) and the shared third switching valve $V_3$. In this case, by accordingly connecting the switching valves $V_{2,i}$ (or $V_{1,i}$), the controller 13 then performs a switch from one section $S_i$ to the next section $S_{i+1}$ in the succession when the pressure in the section $S_i$ currently being used for dispensing drops below a predetermined first threshold value. The first threshold value can for example be in the range of 300 to 400 bar, e.g., approximately 350 bar.

In addition, during dispensing and/or during breaks in operation when nothing is currently being dispensed, the controller 13 can transfer pressurized fluid from one or more other sections $S_{i\pm j}$ (j>O) which is/are not currently being used for dispensing because its pressure is below the first threshold value, via its respective first switching valve $V_{1,i\pm j}$, the high-pressure pump 3 and the respective second switching valve $V_{2,i}$ (optionally by opening the additional switching valves $V_6$ and $V_7$, if present), into the section $S_i$ that is currently being used for dispensing pressurized fluid or is intended for the next dispensing operation. As a result, the highest possible pressure level is maintained in the section $S_i$ currently being used for the dispensing via the low-pressure path 8 for as long as possible.

The high-pressure pump 3 is likewise used for dispensing pressurized fluid via the high-pressure path 6. For this purpose, the controller 13 controls the switching valves $V_4$ and $V_5$ such that they refill the high-pressure reservoir 4 from one or more sections $S_i$ via the respective first switching valve $V_{1,i}$ thereof, the high-pressure pump 3, and the fourth switching valve $V_4$ when the pressure in the high-pressure reservoir 4 drops below a predetermined second threshold value. To dispense pressurized fluid via the high-pressure path 6 and the dispenser outlet 8, the fifth switching valve $V_5$ is then opened in order to supply pressurized fluid from the high-pressure reservoir 4 to the high-pressure path 6.

For refilling the high-pressure reservoir 4 via the high-pressure pump 3, that section $S_i$ that has the highest pressure can, e.g., be used to keep the pressure differential between the input 11 and the output 12 of the high-pressure pump 3 as low as possible and to facilitate its operation.

Refueling operations at the dispensing outlet 9 of the low-pressure path 8 can each be supplied with the current highest pressure level from the section $S_i$. Alternatively, one or more of the sections $S_i$ can be used of which the pressure level is still sufficient for a safe and rapid operation for refueling a vehicle at the dispenser connection 9, for example if the vehicle tank is almost empty (pressure of, e.g., at most 175 bar) and there is still at least a pressure differential of, e.g., 100 bar from the respective section $S_i$, e.g., when this is at least 275 bar. When the pressure in the vehicle tank increases as refueling continues, a switch can then be made to another section $S_i$ having a higher pressure so that a sufficient pressure differential is always ensured between the section $S_i$ currently being used and the vehicle tank to allow the pressurized fluid to flow into the vehicle tank.

In all the embodiments described herein, the dispenser 5 can be equipped with a cooler 15 for the high-pressure path 6 and the low-pressure path 8 in order to keep pressurized fluid dispensed at the dispenser outlets 7, 9 at a low temperature of, e.g., −40° C.

The filling station 1 of the present disclosure only requires a single, comparatively small high-pressure pump 3 in connection with a comparatively small high-pressure reservoir 4 and a partitioned storage container 2 in order for it to be possible to rapidly refuel vehicles at two different pressure levels. As a result, the investment, maintenance, and energy costs are reduced, as well as the costs of safety technology, such as fire and explosion protection.

The disclosed subject matter is not limited to the embodiments set out and described, but instead covers all the variants, modifications, and the combinations thereof that fall within the scope of the accompanying claims.

What is claimed is:

1. A filling station for pressurized fluids, comprising a storage container for the pressurized fluid and a dispenser supplied by the storage container, wherein the dispenser has a high-pressure path and a low-pressure path for dispensing the pressurized fluid, wherein the storage container is partitioned into separate sections, which are each connected to the input of a high-pressure pump via a first switching valve and to the output of said high-pressure pump via a second switching valve, wherein the first or second switching valves, on their pump sides, are connected to the low-pressure path of the dispenser via a third switching valve, and wherein the output of the high-pressure pump supplies a high-pressure reservoir via a fourth switching valve, the high-pressure reservoir being connected to the high-pressure path of the dispenser via a fifth switching valve.

2. The filling station of claim 1, wherein all the switching valves are controlled by a controller, which is connected to pressure sensors of the sections and of the high-pressure reservoir and is configured, when pressurized fluid is dispensed via the low-pressure path, to connect the sections to the low-pressure path individually in succession via the respective second switching valve and the third switching valve, and, when pressurized fluid is dispensed via the high-pressure path, to connect the high-pressure reservoir to the high-pressure path via the fifth switching valve.

3. The filling station of claim 2, wherein the controller is configured to perform a switch to the next section in said succession when the pressure in the section currently being used for dispensing drops below a predetermined first threshold value.

4. The filling station of claim 2, wherein the controller is configured to transfer pressurized fluid from at least one section, the pressure of which is below the first threshold value, via the respective first switching valve, the high-pressure pump, and the respective second switching valve into the section used or intended for the dispensing.

5. The filling station of claim 2, wherein the controller is configured to refill the high-pressure reservoir from at least one of the sections via the respective first switching valve, the high-pressure pump, and the fourth switching valve when the pressure in the high-pressure reservoir drops below a predetermined second threshold value.

6. The filling station of claim 1, wherein the storage container is in the form of a transportable container.

7. The filling station of claim 1, wherein each section consists of a group of pressure cylinders connected in parallel.

8. The filling station of claim 1, wherein all the first switching valves are connected to the input of the high-pressure pump, with a shared sixth switching valve being interposed.

9. The filling station of claim 1, wherein all the second switching valves are connected to the output of the high-pressure pump, with a seventh switching valve being interposed.

10. The filling station of claim 1, wherein the dispenser has a cooler both for the high-pressure path and the low-pressure path.

11. The filling station of claim 2, wherein the storage together with the first and the second switching valves and the controller is in the form of a transportable container.

* * * * *